United States Patent [19]
Fujita et al.

[11] Patent Number: 5,827,020
[45] Date of Patent: Oct. 27, 1998

[54] NUMERICAL CONTROL APPARATUS

[75] Inventors: Jun Fujita, Mishima; Koichi Kikuchi; Koichi Kato, both of Numazu; Hironobu Ohara, Tagata-Gun; Hiromasa Suzuki, Fuji; Kanji Atsumi, Suntou-Gun, all of Japan

[73] Assignee: Toshiba Kikai Kabushiki Kaisha, Tokyo-To, Japan

[21] Appl. No.: 678,185

[22] Filed: Jul. 11, 1996

[30] Foreign Application Priority Data

Jul. 11, 1995 [JP] Japan .................................. 7-175277

[51] Int. Cl.$^6$ ...................................... B23C 1/16
[52] U.S. Cl. ...................... 409/80; 378/571; 364/474.15; 409/186
[58] Field of Search ................ 364/474.222, 474.15, 364/474.17; 408/11; 409/80, 186, 187, 194; 318/571

[56] References Cited

U.S. PATENT DOCUMENTS

| | | | |
|---|---|---|---|
| 3,612,841 | 10/1971 | Kosem | 318/571 |
| 3,665,493 | 5/1972 | Glowzewski et al | 318/571 |
| 3,918,348 | 11/1975 | Runft | 318/571 |
| 4,115,858 | 9/1978 | Kaufman | 364/474 |
| 4,150,327 | 4/1979 | Camera et al. | 318/571 |
| 4,346,444 | 8/1982 | Schneider et al. | 408/11 |
| 4,513,381 | 4/1985 | Houser, Jr. et al. | 318/571 |
| 4,688,970 | 8/1987 | Echman | 408/10 |
| 4,791,342 | 12/1988 | Okamoto | 318/571 |
| 4,879,660 | 11/1989 | Asakura et al. | 318/571 |
| 5,104,268 | 4/1992 | Kitagawa et al. | 409/66 |
| 5,404,308 | 4/1995 | Kajiyama | 364/474.3 |

FOREIGN PATENT DOCUMENTS

60-84609 5/1985 Japan ................................. 318/571

*Primary Examiner*—A. L. Pitts
*Assistant Examiner*—Christopher Kirkman
*Attorney, Agent, or Firm*—Pillsbury Madison & Sutro LLP

[57] ABSTRACT

A numerical control apparatus can process a workpiece at high speed and high precision while suppressing tool abrasion by maintaining optimum cutting conditions determined by a combination of spindle rotational speed and tool feed speed. A spindle rotational speed control section changes the speed of the spindle according to a tool feed speed obtained by a tool feed speed deciding section based on the shape of the tool moving path commanded by a machining program. Alternatively, the spindle rotational speed is changed by a spindle rotational speed control section based on a change in the contact position between the tool and the workpiece to be cut in the tool axial movement direction. Further, the spindle rotational speed may be changed by the spindle rotational speed control section based on the tool feed speed including tool axial movement direction data obtained by a feed speed deciding section based on the shape of the tool moving path.

11 Claims, 5 Drawing Sheets

F I G. 6A        F I G. 6B $\theta = \tan^{-1}(a/b)$
$r(\theta) = R \pm \sin(\theta)$

F I G. 7

NUMERICAL CONTROL APPARATUS

BACKGROUND OF THE INVENTION

1. Field of the Invention

The present invention relates to a numerical control (NC) apparatus for controlling a machine tool, and more specifically to a numerical control apparatus suitable for machining a free curved surface of workpiece at high speed and at high precision.

2. Description of the Prior Art

In a numerically controlled (NC) machine tool for machining a free curved surface of workpiece at high speed and at high precision, in general the tool movement paths are commanded in accordance with a processing program. Further, a tool feed speed along the commanded path is also commanded by F (feed) codes described in the processing program. However, when the tool is fed at a tool feed speed commanded by the F codes, there exists a problem in that a high precision cannot be obtained due to an error caused by the delay of a servo-system, etc.

In order to overcome this problem, in the recent numerical control apparatus for machining a free curved surface of workpiece at high speed and at high precision, the following function is additionally provided: the shape of the commanded tool movement path is first evaluated; a maximum allowable tool feed speed for keeping the machining precision in an allowable error range is calculated according to the evaluated shape of the tool moving path; and the tool feed speed is reduced automatically below the maximum allowable tool feed speed, irrespective of the tool feed speed commanded in accordance with the F codes of the processing program.

On the other hand, although the revolution number of a spindle is commanded in accordance with S (spindle) codes also described in the processing program, there exists an optimum combination between the spindle revolution number and the tool feed speed according to cutting conditions. However, in the case where there is provided the above-mentioned function such that the tool feed speed is automatically controlled according to the shape of the tool moving path, when the tool feed speed is commanded in accordance with the F codes and the spindle revolution number is commanded in accordance with the S codes both described in the processing program, since the tool feed speed is largely limited, there arises such a problem that the tool feed speed differs much from a speed commanded by the F codes, in spite of the fact that the revolution number of the spindle is kept at a constant value.

The above-mentioned problem will be explained hereinbelow in a more practical way.

In general, it is understood that the excellent cutting conditions are obtained when the tool feed rate for each blade is kept constant and the cutting speed is also kept constant. Here, the cutting speed is a relative tangential speed at a contact point between a tool and workpiece to be cut.

Figure 4:
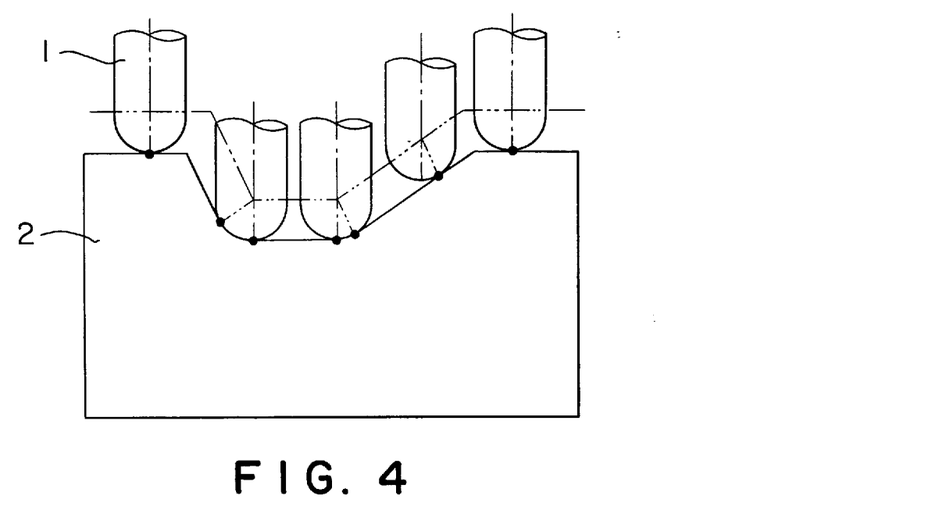
FIG. 4 is an illustration for assistance in explaining the way of cutting of a die by use of a ball end mill.

Here, the case where a die or a metallic mold is cut off by use of a ball end mill will be taken into account by way of example. In this case, as shown in FIG. 4, since the contact surface between a tool 1 and workpiece (die) 2 changes every moment according to the angle of the outer shape of the workpiece surface, that is, according to a flat portion, a sloped portion, and a corner portion of the workpiece 2, at present it is considered that the optimum way of deciding the revolution number and the feed speed of the tool 1 is to input the empirical values obtained under due consideration of the material and the shape of the workpiece 2 to be cut.

In the present cutting method, it has been known that it is preferable to reduce the diameter of the cutting tool. This is because when the tool diameter is small, since it is possible to reduce the difference in cutting speed between the different outer shapes of the workpiece surface, a relatively excellent cut surface can be obtained and thereby the cutting tool can be worn uniformly and normally. In contrast with this, when the feed rate for each blade varies, even if an appropriate cutting speed can be given to each outer shape of the workpiece surface, the tool abrasion proceeds. Table 1 lists the general influence upon the tool abrasion when the cutting speed and the feed rate for each blade are varied, respectively.

TABLE 1

(Abrasion due to cutting speed and blade feed rate)

| | CUTTING SPEED | FEED RATE FOR BLADE |
|---|---|---|
| LOW | CHIPPING BY ADHEDED MELTED CHIP LIABLE TO OCCUR | ADHESION OF MELTED CHIP OCCURS IN CASE OF FRICTION CUTTING |
| APPRO-PRIATE | NORMAL ABRASION | NORMAL ABRASION |
| HIGH | EARLY INCREASE OF ABRASION DUE TO CUTTING HEAT | BLADE DEFORMATION OR DAMAGE DUE TO LARGE CUTTING LOAD |

Therefore, the reduction of tool abrasion is an ultimate problem among various problems involved in the tool system, so that tool makers and the manufacturing division using tools are now developing improved tool materials and blade shapes eagerly. However, in the case of the machining of the free curved surface of various shapes, it is difficult to decide the optimum conditions as listed in Table 1 above, and thereby no prominent improvement has been so far obtained. In other words, in the present machining process, when the tool cutting speed is decided on the basis of the tool side surface, the workpiece is torn off at the tool end, and when tool cutting speed is decided on the basis of the tool top end, the tool side surface is easily worn off, thus causing an antinomic phenomenon.

Further, in order to realize an appropriate cutting speed and an appropriate feeding rate for each blade, it may be considered to add commands indicative of an appropriate tool feed speed and an appropriate spindle revolution number to the processing program, according to the contact position between the tool and the outer shape of the workpiece surface to be cut. In this case, however, as already explained, when the tool feed speed is changed according to the outer shape of the workpiece surface on the NC side, there arises a problem in that the relationship between the optimum tool feed speed and the spindle revolution number described in the processing program cannot be maintained. Further, when the S values added to the processing program are changed according to the movement directions of the tool, since characters Sxxxxx must be added to each block of the workpiece in the processing program, the number of characters of the processing program extremely increases. As a result, the other problems arise in that the capacity of the memory for storing the processing program must be increased and further in that the communication speed must be increased in the case of a remote buffer operation.

SUMMARY OF THE INVENTION

With these problems in mind, therefore, it is the object of the present invention to provide a numerical control apparatus for machining a free curved surface of workpiece, which can prevent the actual machining conditions from much differing from the optimum cutting conditions obtained by a combination between the tool feed speed and the spindle revolution number determined according to the cutting conditions and further which can process the free curved surface of the workpiece at high speed and at high precision, while suppressing the tool abrasion and an increase of the program capacity.

According to a first aspect of the present invention, there is provided a numerical control apparatus for controlling a machine tool for machining a free curved surface of workpiece, comprising:

tool feed speed deciding means for obtaining tool feed speed on the basis of a shape of a tool moving path commanded by a processing program; and spindle revolution number control means for changing a revolution number of a spindle according to the decided tool feed speed.

According to a second aspect of the present invention, there is provided a numerical control apparatus for controlling a machine tool for machining a free curved surface of workpiece, comprising spindle revolution number controlling means for calculating a spindle revolution number on the basis of change in contact position between a tool moved in an axial movement direction commanded by a processing program and workpiece to be cut.

According to a third aspect of the present invention, there is provided a numerical control apparatus for controlling a machine tool for machining a free curved surface of workpiece, comprising:

tool feed speed deciding means for obtaining tool feed speed on the basis of a tool moving path commanded by a processing program; and spindle revolution number control means for changing a spindle revolution number on the basis of change in contact position between a tool moved at the obtained tool feed speed in an axial movement direction commanded by the processing program and a workpiece to be cut.

DETAILED DESCRIPTION OF THE PREFERRED EMBODIMENTS

Some embodiments of the numerical control apparatus according to the present invention will be described hereinbelow with reference to the attached drawings.

Figure 1:
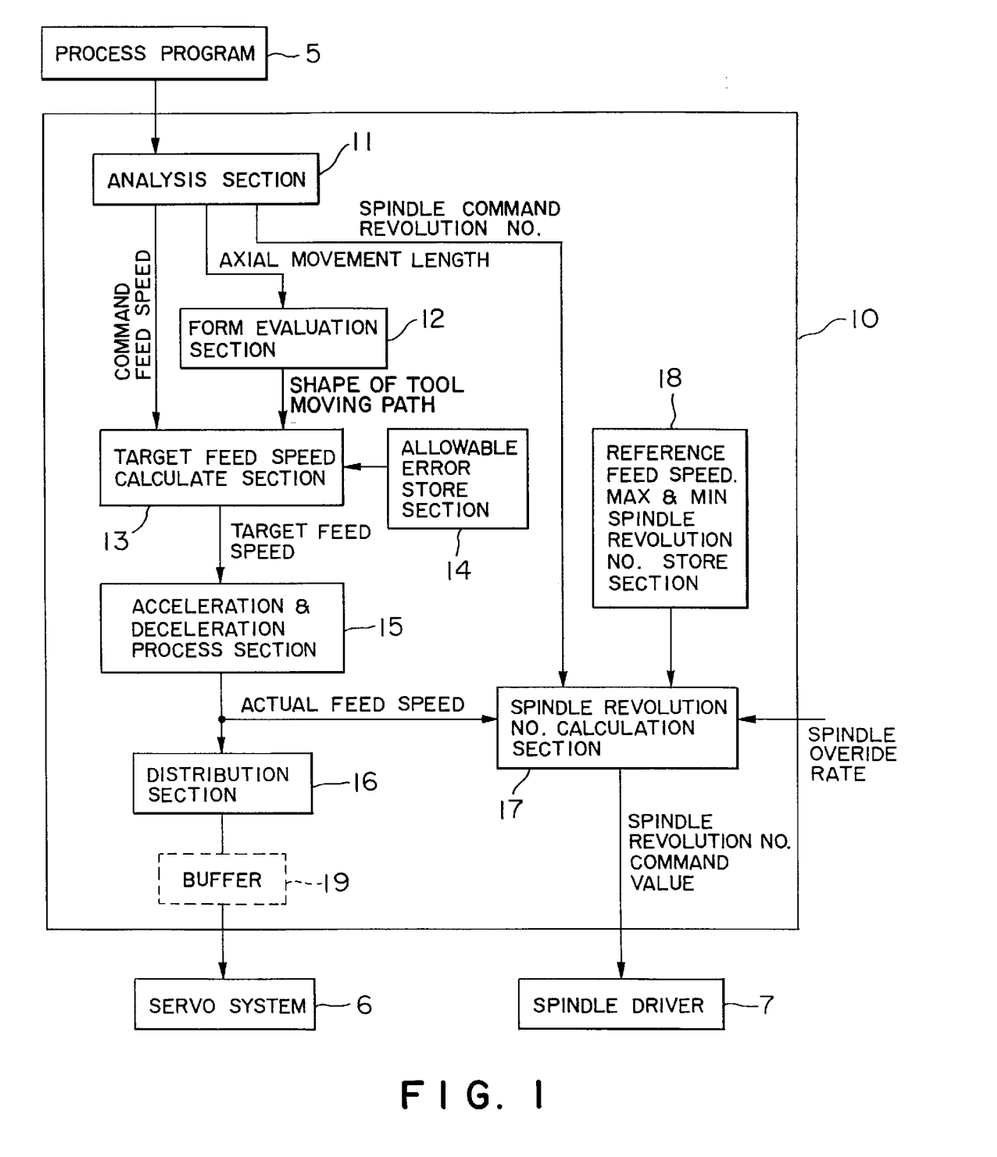
FIG. 1 is a block diagram showing a first embodiment of the numerical control apparatus according to the present invention.

FIG. 1 is a block diagram showing a first embodiment of the numerical control apparatus according to the present invention.

First, a machining program 5 is analyzed by an analyzing section 11 of the numerical control apparatus 10. That is, the analyzing section 11 extracts a character string of F codes and S codes from a character string described in a machining program, and obtains a tool axial movement length, a commanded tool feed speed, and a commanded spindle revolution number, etc. Here, for instance, the tool axial movement length can be obtained on each axis of X, Y and Z beginning from the machining start point coordinates to the machining end point coordinates. Further, these axial movement lengths are obtained for each block of the workpiece to be cut.

The obtained axial movement length is transmitted to a form evaluating section 12 to obtain a tool movement form. The shape of the tool moving path can be evaluated by analyzing the axial movement length of each of a plurality of the blocks for constituting the workpiece, that is, by discriminating whether the tool axial movement form belongs to a curved portion or a corner portion of the workpiece to be cut. Here, a straight line is recognized as a curved portion having an infinite radius of curvature.

On the basis of the evaluated shape of the tool moving path, a target feed speed calculating section 13 decides a target tool feed speed under consideration of the commanded tool feed speed. In this case, although the tool feed speed decided on the basis of the shape of the tool moving path has a priority, when the workpiece is cut at the tool feed speed decided temporarily, the target feed speed calculating section 13 checks whether the machining precision lies within an allowable error range stored in an allowable error storing section 14. Further, when the machining precision does not lie within the allowable error range, the tool feed speed is corrected so as to lie within the allowable range, and the decided target tool feed speed is outputted from the target feed speed calculating section 13 to the succeeding stage.

Here, although the target tool feed speed is decided for each block of the workpiece to be cut, since there exists such a case that the tool feed speed changes largely at a change position in outer shape between blocks for constituting the workpiece to be cut, an acceleration and deceleration processing section 15 executes some necessary processing to obtain an actual tool feed speed, in order to smoothly change the tool feed speeds at a change position between the two different blocks for constituting the workpiece.

The obtained actual tool feed speed is transformed by a distributing section 16 into a plurality of tool movement commands for each axis, and then transmitted to a servo-system 6 provided for each axis.

On the other hand, the commanded spindle revolution number obtained by the analyzing section 11 is transmitted to a spindle revolution number calculating section 17. This spindle revolution number calculating section 17 obtains a spindle revolution number command value Sx on the basis of a reference tool feed speed, a maximum spindle revolution number, a minimum spindle revolution number, the actual tool feed speed, and a spindle override rate. The obtained command value Sx is outputted to a spindle driver 7.

Figure 5:
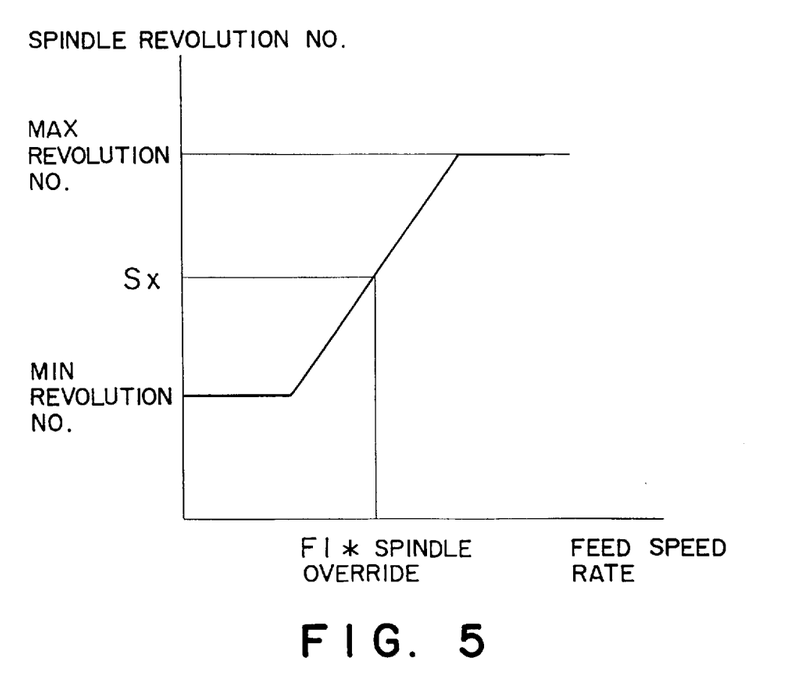
FIG. 5 is a graphical representation showing the relationship among the reference tool feed speed, the maximum spindle revolution number, the minimum spindle revolution number, the actual tool feed speed and spindle revolution number both obtained by calculations.

Here, the spindle revolution number command value Sx can be calculated as follows: There exists the relationship among the reference tool feed speed, the maximum spindle revolution number, the minimum spindle revolution number, and the actual tool feed speed and the spindle revolution number both obtained in accordance with calculations, as shown in FIG. 5. Now, if Fx is defined as Fx=actual feed speed/reference feed speed the spindle revolution number command value Sx can be expressed as follows:

Sx=command revolution number * Fx * spindle override

However, since this spindle revolution number command value Sx must lie in a range between the previously decided minimum revolution number and the maximum revolution number, Sx is decided so as to satisfy the following condition:

minimum revolution number≦Sx≦maximum revolution number

The spindle revolution number command value Sx thus obtained is transmitted to the spindle driver 7 to control the rotation of the spindle.

In this first embodiment, since the revolution number of the spindle can be controllably changed according to the tool feed speed and the tool movement direction both controlled according to the tool moving path, it is possible to machine or process the workpiece under such an excellent condition close to an optimum combination between the tool feed speed and the spindle revolution number, so that it is possible to reduce the tool abrasion and thereby to reduce a height difference on the tool surface. Further, since the feed speed for each blade can be uniformalized, the surface precision on the machined workpiece can be improved.

Further, in general, there exists such a tendency that the acceleration or deceleration time of the spindle is longer than those of the tool axial movement. To overcome this problem, it is preferable to match the timing of the tool axial movement with that of the spindle, by providing a delay buffer 19 at the output stage of the axial movement command.

Figure 2:
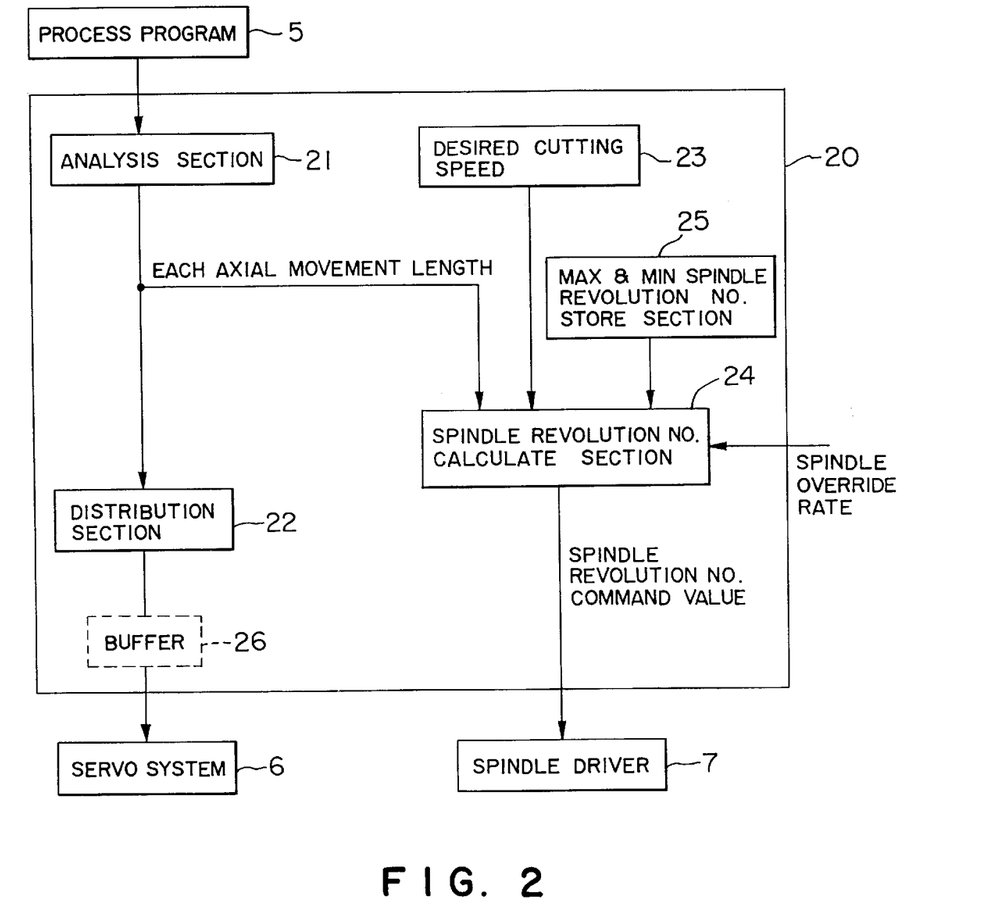
FIG. 2 is a block diagram showing a second embodiment of the numerical control apparatus according to the present invention.

A second embodiment of the numerical control apparatus 20 according to the present invention will be described hereinbelow with reference to FIG. 2. In this second embodiment, the commanded spindle revolution number is not previously described in the machining program.

First, a machining program 5 is analyzed by an analyzing section 21 of the numerical control apparatus 20. That is, the analyzing section 21 extracts a character string of the X codes, etc. from a character string described in the machining program, to obtain a tool axial movement length. Here, for instance, the tool axial movement length can be obtained on each axis of X, Y and Z beginning from the machining start point coordinates to the machining end point coordinates. Further, these axial movement lengths are obtained for each block of the workpiece to be cut. The obtained tool axial movement lengths are transmitted to a distributing section 22, and transformed into the tool axial movement commands for each axis. The transformed axial movement commands for each axis are transmitted to a servo-system 6 provided for each axis.

On the other hand, the axial movement length for each axis is given to a spindle revolution number calculating section 24. To this spindle revolution number calculating section 24, a desired tool cutting speed (determined as a reference value) stored in a target cutting speed storing section 23, a maximum spindle revolution number and a minimum spindle revolution number both stored in the maximum and minimum spindle revolution number storing section 25, the axial movement length for each axis, and the spindle override rate are inputted. Therefore, the spindle revolution number calculating section 24 obtains the spindle revolution number command value S on the basis of these inputted values. The obtained command value S is outputted to a spindle driver 7.

Figure 6A:
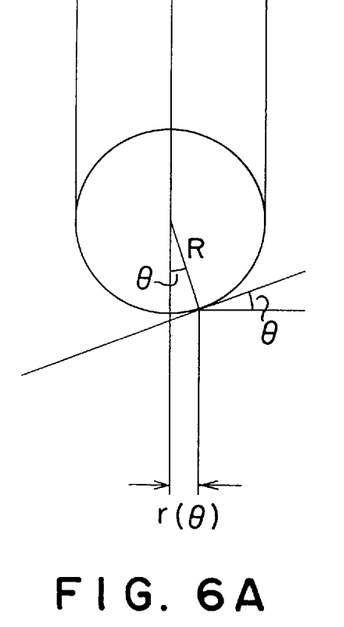
FIGS. 6A and 6B are illustrations for assistance in explaining the difference of the cutting speed between two machining positions when a workpiece is cut by use of a ball end mill.
Figure 6B:
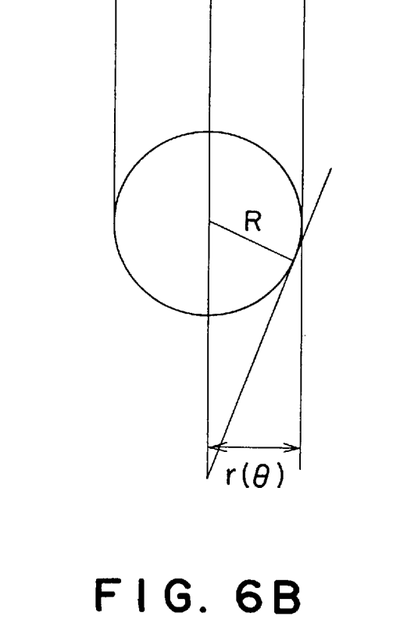

The method of calculating the spindle revolution number will be described hereinbelow by taking the case of a ball end mill. As shown in FIGS. 6A and 6B, in the case where a tool (ball end mill) is mounted in parallel to the vertical axis direction and thereby the machining surface of the workpiece matches the tangential direction of the tool (ball end mill), if the workpiece is moved in a plane perpendicular to the vertical axis direction (tool axis direction), the workpiece is cut off by a top end of the tool; and if the workpiece is moved in the vertical axis direction (tool axis direction), the workpiece is cut off by the side surface of the tool.

Figure 7:
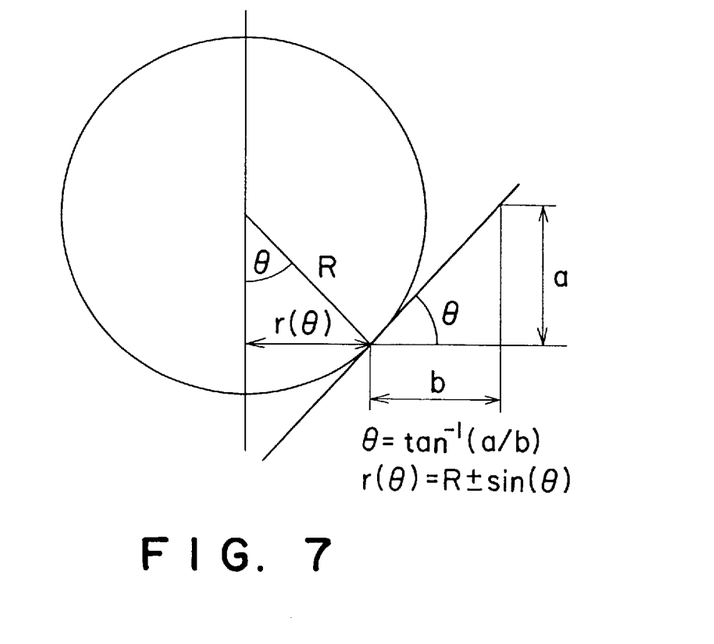
FIG. 7 is an illustration for assistance in explaining the calculation for obtaining the spindle revolution number.

Further, on condition that the spindle revolution number is kept constant, when the workpiece is machined by the top end of the tool as shown in FIG. 6A, since the radius r(θ) of the contact position between the tool and the workpiece from the tool center position is minimized, the cutting speed is also minimized. On the other hand, when the workpiece is machined by the side surface of the tool as shown in FIG. 6B, since the radius r(θ) of the contact position between the tool and the workpiece from the tool center position is maximized, the cutting speed is also maximized. Therefore, in order to keep the tool cutting speed V (mm/sec) always constant, the spindle revolution number S can be obtained with reference to FIG. 7 as follows:

since $$\theta=\tan^{-1}(a/b)$$

$$r(\theta)=R * \sin(\theta)$$

where R (mm) denotes the radius of the ball end mill; V (mm/sec) denotes the desired tool tangential cutting speed; a (mm) denotes the movement length in the vertical axis direction (tool axial direction); and b (mm) denotes the movement length on a plane perpendicular to the vertical axis direction (tool axial direction).

The tool cutting speed V (mm/sec) at a point r(θ) obtained when the spindle revolution number is S (rpm) can be expressed as:

$$V=S/60 * 2n * r(74), (\text{mm/sec})$$

The above expression can be transformed as follows:

$$S=(60/2n) * (V/r(\theta))$$

Therefore, the spindle revolution number S must be limited in a range between the minimum spindle revolution number and the maximum spindle revolution number as follows:

minimum revolution number ≦Sx≦maximum revolution number

In this second embodiment, although the movement length of each axis is used to calculate the revolution number of the spindle, this method results in the estimation of the contact position between the tool and the machined surface according to the tool moving direction, in order to calculate the spindle revolution number. In this method, therefore, since the workpiece can be machined by setting the spindle revolution number at an optimum cutting condition (a constant cutting speed) according to the tool movement length along each axis, it is possible to shorten the machining time and to reduce the tool abrasion and thereby the height difference on the tool surface, with the result that the tool cost can be economized.

In addition, since it is unnecessary to record the optimum spindle revolution number commands (S commands) in the machining program, the machining program can be shortened, as compared with when the optimum spindle revolution number commands (S commands) are described in the machining program. Therefore, it is possible to shorten the machining program, reduce the memory for storing the machining program, and decrease the communication speed during the remote buffer operation.

Further, in general, there exists such a tendency that the acceleration or deceleration time of the spindle is longer than that of the tool axial movement. To overcome this problem, it is preferable to match the timing of the tool axial movement with that of the spindle, by providing a delay buffer 26 at the output stage of the tool axial movement command.

Figure 3:
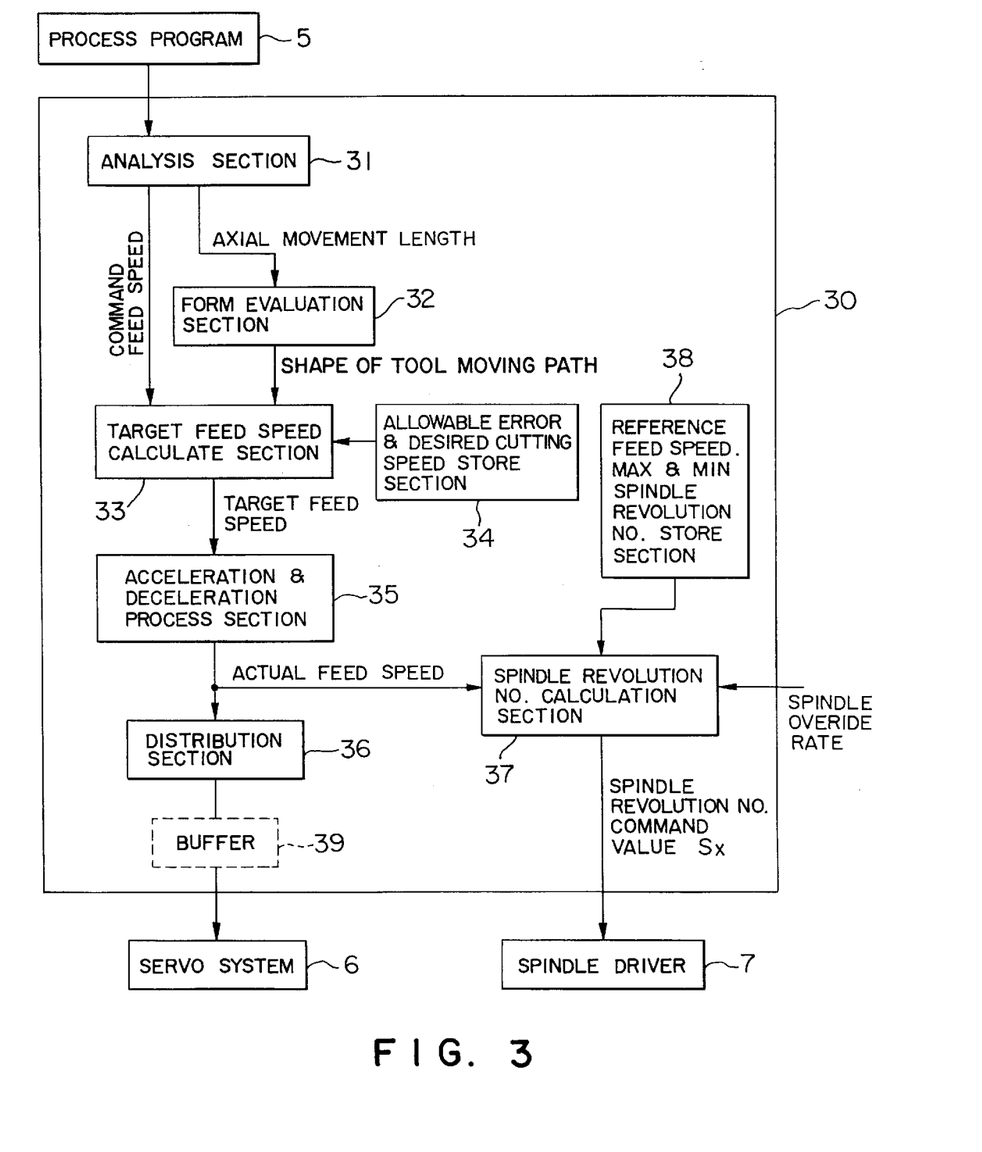
FIG. 3 is a block diagram showing a third embodiment of the numerical control apparatus according to the present invention.

FIG. 3 is a block diagram showing a third embodiment of the numerical control apparatus according to the present invention. In this third embodiment, any command values of the spindle revolution numbers are not described in the processing program.

First, a machining program 5 is analyzed by an analyzing section 31 of the numerical control apparatus 30. That is, the analyzing section 31 extracts a character string of X codes, etc. from a character string described in the machining program, and obtains a tool axial movement length, and a tool commanded feed speed. Here, for instance, the method of obtaining the tool axial movement length is the same as with the case of the first embodiment.

The obtained tool axial movement length is transmitted to a form evaluating section 32 to obtain a shape of a tool moving path. The shape of the tool moving path can be evaluated in the same way as with the case of the first embodiment.

On the basis of the evaluated shape of the tool moving path, a target feed speed calculating section 33 decides a target tool feed speed under consideration of the commanded tool feed speed. In this case, when the workpiece is machined at the decided tool feed speed, the target feed speed calculating section 33 checks whether the machining precision lies within an allowable error range on the basis of the allowable errors stored in an allowable error and desired cutting speed storing section 34. Further, when the machining precision does not lie within the allowable error range, the tool feed speed is corrected so as to lie in the allowable range, and the decided first target tool feed speed Fe is outputted from the target feed speed calculating section 33 to the succeeding stage.

Further, in order to make constant the tool cutting speed, the tool feed speed is evaluated in the movement direction thereof to obtain a second target tool feed speed Fc as follow:

In the same way as with the case of the second embodiment, in the case of the ball end mill, since the spindle revolution number S can be obtained as already explained as follows:

$$S=(60/2n) * (V/r(\theta))$$

by multiplying this tool feed speed by a transform coefficient K (mm/rev), it is possible to obtain a target tool feed speed Fc for making constant the tool cutting speed as follows:

$$Fc=K * S \text{ (mm/min)}$$

In this third embodiment, the smaller one of the Fc and Fe is used as the target tool feed speed at this time point.

The above-mentioned target tool feed speed is decided for each block of the workpiece. However, since there exists such a case where the feed speed changes largely at a change portion in outer shape between blocks for constituting the workpiece, an acceleration and deceleration processing section 35 executes some necessary adjustment processing to obtain an actual feed speed, in order to smoothly change the two feed speeds at a change point between the two different blocks for constituting the workpiece.

The obtained actual feed speed is transformed by a distributing section 36 into a movement command for each axis, and then transmitted to a servo-system 6 provided for each axis.

The obtained actual spindle revolution number is also given to a spindle revolution number calculating section 37. This spindle revolution number calculating section 37 calculates a spindle revolution number command value Sx on the basis of a reference tool feed speed, a maximum spindle revolution number, a minimum spindle revolution number, and a spindle override rate all stored in a storing section 38, and outputs the obtained command value Sx to a spindle driver 7. Here, the spindle revolution number can be calculated in the same way as with the case of the first embodiment as follows:

Fx=actual feed speed /reference feed speed,

Further, the spindle revolution number command value Sx can be expressed as

Sx=command revolution number * Fx * spindle override

However, Sx is decided so as to satisfy the following condition:

minimum revolution number $\geq$ Sx $\geq$ maximum revolution number

The spindle revolution number command value Sx thus obtained is transmitted to the spindle driver 7 to control the rotation of the spindle.

In this third embodiment, since the revolution number of the spindle can be controllably changed according to the tool feed speed and the tool axial movement direction both controlled according to the shape of the moving path for the workpiece to be cut, it is possible to machine the workpiece under such an excellent condition close to an optimum combination between the tool feed speed and the spindle revolution number, so that it is possible to reduce the tool abrasion and thereby to reduce a height difference on the tool surface. Further, since the feed speed for each blade can be made uniform, the surface precision on the machined workpiece can be improved.

Further, in general, there exists such a tendency that the acceleration or deceleration time of the spindle is longer than that of the tool axis movement. To overcome this problem, it is preferable to match the timing of the tool axial movement with that of the spindle, by providing a delay buffer 39 at the output stage of the tool axial movement command.

As described above, in the numerical control apparatus according to the present invention, since the workpiece can be machined under such an excellent condition close to the optimum cutting condition (constant cutting speed), it is possible to reduce the tool abrasion and the height difference on the tool surface, so that the tool cost can be economized. Further, since the feed rate for each blade can be made uniform, the surface precision of the machined workpiece can be improved.

Further, when the spindle revolution number command values are not described in the machining program, the processing program can be shortened, so that the memory size for storing the machining program can be reduced. Further, it is unnecessary to increase the communication speed during the remote buffer operation.

What is claimed is:

1. A numerical control apparatus for controlling a machine tool for machining a free curved surface of a workpiece, comprising:

tool feed speed deciding means for obtaining tool feed speed on the basis of a shape of a tool moving path commanded by a machining program; and spindle revolution number control means for changing a revolution number of a spindle according to the decided tool feed speed, wherein said tool feed speed deciding means includes analyzing means for analyzing the machining program, tool moving path shape deciding means for obtaining the shape of the tool moving path, target tool feed speed calculating means for calculating a target tool feed speed in an allowable range decided on the basis of the shape of the tool moving path obtained by said tool moving path shape deciding means, and an acceleration and deceleration processing section for calculating an actual tool feed speed on the basis of the target tool feed speed so that a change position in outer shape between blocks for constituting the workpiece can be connected smoothly.

2. A numerical control apparatus for controlling a machine tool for machining a free curved surface of a workpiece, comprising:

tool feed speed deciding means for obtaining tool feed speed on the basis of a shape of a tool moving path commanded by a machining program: and spindle revolution number control means for changing a revolution number of a spindle according to the decided tool feed speed, wherein said spindle revolution number control means decides the spindle revolution number command value Sx in accordance with Sx=commanded revolution number * Fx * spindle override where Fx=actual tool feed speed/reference tool feed speed, and on condition that minimum spindle revolution number≦Sx≦maximum spindle revolution number.

3. A numerical control apparatus for controlling a machine tool for machining a free curved surface of a workpiece, comprising:

tool feed speed deciding means for obtaining tool feed speed on the basis of a shape of a tool moving path commanded by a machining program; and spindle revolution number control means for changing a revolution number of a spindle according to the decided tool feed speed, wherein said tool feed speed deciding means includes delaying means for delaying a timing at which the tool axial movement command is outputted to a servo-system, according to a spindle side response delay caused by an acceleration and deceleration time constant of the spindle.

4. A numerical control apparatus for controlling a machine tool for machining a free curved surface of a workpiece, comprising:

tool feed speed deciding means for obtaining a tool feed speed on the basis of a shape of a tool moving path commanded by a machining program; and spindle revolution number control means for changing a spindle revolution number on the basis of a change in contact position between a tool moved at the obtained tool feed speed in an axial movement direction commanded by the machining program and a workpiece to be cut.

5. The numerical control apparatus of claim 4, wherein said spindle revolution number control means calculates the spindle revolution number on the basis of a ratio of a tool movement length changing during an interval of time in a vertical axis direction to a tool movement length on a plane perpendicular to the vertical axis direction.

6. The numerical control apparatus of claim 5, wherein the machining tool is a ball end mill having a radius R (mm); and said spindle revolution number calculating means calculates the spindle revolution number S (rpm) decided on the basis of a desired tangential tool cutting speed V (mm/sec) at a tool machining point in accordance with $$\theta=\tan^{-1}(a/b)$$

$$r(\theta)=R * \sin(\theta)$$

$$S=(60/2n) * (V/r(\theta))$$

where a (mm) denotes the movement length in the vertical axis direction; and b (mm) denotes the tool movement length on the plane perpendicular to the vertical axis direction.

7. The numerical control apparatus of claim 4, wherein said spindle revolution number control means calculates the spindle revolution number on the basis of a ratio of a tool movement length changing during an interval of time in a tool axial direction to a tool movement length on a plane perpendicular to the tool axial direction.

8. The numerical control apparatus of claim 7, wherein the machining tool is a ball end mill having a radius R (mm); and said spindle revolution number calculating section calculates the spindle revolution number S (rpm) decided on the basis of a desired tangential tool cutting speed V (mm/sec) at a tool machining point in accordance with $$\theta=\tan^{-1}(a/b)$$

$$r(\theta)=R * \sin(\theta)$$

$$S=(60/2n) * (V/r(\theta))$$

where a (mm) denotes the movement length in the tool axis direction; and b (mm) denotes the tool movement length on the plane perpendicular to the tool axis direction.

9. The numerical control apparatus of claim 4, wherein said spindle revolution number control means decides the spindle revolution number according to the tool feed speed on the basis of at least any one of a reference tool feed speed, a commanded spindle revolution number, a maximum spindle revolution number, a minimum spindle revolution number, and a spindle override rate.

10. The numerical control apparatus of claim 4, wherein said tool feed speed deciding means comprises:

analyzing means for analyzing the machining program;

tool moving path shape deciding means for obtaining the shape of the tool moving path; and target tool feed speed calculating means for calculating a target tool feed speed in an allowable range decided on the basis of the tool movement form obtained by said tool moving path deciding means.

11. The numerical control apparatus of claim 4, wherein said tool feed speed deciding means further comprises delaying means for delaying a timing at which the tool axial movement command is outputted to a servo-system.

* * * * *